(12) United States Patent
Chanler et al.

(10) Patent No.: US 9,678,869 B1
(45) Date of Patent: Jun. 13, 2017

(54) OPTIMIZED READ PROCESSING

(71) Applicant: EMC IP Holding Company LLC, Hopkinton, MA (US)

(72) Inventors: Andrew Chanler, Berlin, MA (US); Michael Scharland, Franklin, MA (US); Gabriel BenHanokh, Tel-Aviv (IL); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/868,499

(22) Filed: Sep. 29, 2015

(51) Int. Cl.
*G06F 12/00* (2006.01)
*G06F 12/0802* (2016.01)

(52) U.S. Cl.
CPC .. *G06F 12/0802* (2013.01); *G06F 2212/1016* (2013.01); *G06F 2212/1032* (2013.01)

(58) Field of Classification Search
CPC ...... G06F 12/00; G06F 12/08; G06F 12/0802; G06F 12/0804
USPC .......................... 711/100, 117, 118, 154, 200
See application file for complete search history.

(56) References Cited

U.S. PATENT DOCUMENTS

| | | | |
|---|---|---|---|
| 5,544,347 A | 8/1996 | Yanai et al. | |
| 5,742,792 A | 4/1998 | Yanai et al. | |
| 6,968,369 B2 | 11/2005 | Veprinsky et al. | |
| 7,054,883 B2 | 5/2006 | Meiri et al. | |
| 8,046,551 B1 * | 10/2011 | Sahin | G06F 11/2074 711/162 |
| 2007/0073972 A1 * | 3/2007 | Zohar | G06F 3/0611 711/129 |
| 2011/0185113 A1 * | 7/2011 | Goss | G06F 12/0253 711/103 |
| 2012/0210068 A1 * | 8/2012 | Joshi | G06F 9/45558 711/122 |
| 2013/0318283 A1 * | 11/2013 | Small | G06F 12/0246 711/103 |

* cited by examiner

*Primary Examiner* — Tuan Thai
(74) *Attorney, Agent, or Firm* — Muirhead and Saturnelli, LLC

(57) ABSTRACT

Described are techniques for processing I/O operations. A read operation is received to read first data from a first location. It is determined whether the read operation is a read miss and whether non-location metadata for the first location is stored in cache. Responsive to determining that the read operation is a read miss and that the non-location metadata for the first location is not stored in cache, first processing is performed that includes issuing concurrently a first read request to read the first data from physical storage and a second read request to read the non-location metadata for the first location from physical storage.

18 Claims, 15 Drawing Sheets

OPTIMIZED READ PROCESSING

BACKGROUND

Technical Field

This application generally relates to I/O processing, and more particularly to techniques used in connection with servicing read operations.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O operations in connection with data requests, such as data read and write operations.

Host systems may store and retrieve data using a data storage system containing a plurality of host interface units, disk drives, and disk interface units. Such data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical units, logical devices or logical volumes. The logical units may or may not correspond to the actual physical disk drives. Allowing multiple host systems to access the single storage device unit allows the host systems to share data stored therein.

An application may execute on a host where the application performs I/O (input/output) operations issued to the data storage system. In servicing a request, such as a request to read data, the data storage system may utilizing caching. For servicing a read operation, the data storage system may first try to service the read request using data stored in cache. If the requested read data is all in cache, the read may be characterized as a read hit. Otherwise, if the requested read data is not all located in cache, the read may be characterized as a read miss whereby the data storage system may retrieve any portions of the requested data which are currently not stored in cache from physical storage device(s), store the retrieved data in cache, and then return the requested read data to the host. Data which is retrieved from physical storage may be stored in cache for servicing possible future read requests for the same data. In this manner, a first read request that is a read miss results in requested read data being stored in cache whereby a second subsequent read for the same read data now stored in cache results in a cache hit. Such caching techniques are utilized with a goal of increasing performance of the data storage system.

SUMMARY OF THE INVENTION

In accordance with one aspect of the invention is a method of processing I/O operations comprising: receiving, from a requester, a read operation to read first data from a first location; determining whether the read operation is a read miss and whether non-location metadata for the first location is stored in cache; and responsive to determining that the read operation is a read miss and that the non-location metadata for the first location is not stored in cache, performing first processing including: issuing concurrently a first read request to read the first data from physical storage and a second read request to read the non-location metadata for the first location from physical storage. Metadata including the non-location metadata for the first location and location metadata for the first location may be stored on physical storage that is a form of non-volatile memory and the cache may be a form of volatile memory providing faster access to stored data than the non-volatile memory. The first processing may include responsive to receiving the non-location metadata requested by the second read request and receiving the first data requested by the first read request, performing data validation of the first data using at least some of the non-location metadata; and responsive to the data validation completing successfully, storing the first data in the cache and returning the first data to the requester. Determining whether the read operation is a read miss may use the location metadata for the first location. Prior to determining whether the read operation is a read miss and determining whether non-location metadata for the first location is stored in cache, the method may include performing other processing including determining whether the location metadata for the first location is stored in cache; and responsive to determining the location metadata for the first location is not in cache, obtaining the location metadata from physical storage and storing the location metadata in the cache. Responsive to determining the location metadata for the first location is not in cache, another request may be issued to read a location metadata chunk from physical storage. The location metadata chunk may include the location metadata for the first location and may also include additional location metadata for one or more other locations, and wherein the location metadata chunk may be stored in the non-volatile memory. The first location may be identified using a logical device and first offset location on the logical device. The additional location metadata may include other location metadata for another offset location logically following the first offset location. The location metadata may be currently in the cache and associated with an attribute having a first setting indicating the location metadata is cache resident denoting that the location metadata is not removed from the cache until the attribute is modified to a second setting indicating that the location metadata is no longer cache resident. The attribute for the location metadata may be dynamically modified from the first setting to the second setting responsive to determining that at least a portion of a logical device including the first location has a change in status from active to inactive. While the attribute has the first setting, processing performed for cache management of the cache may not remove the location metadata from a first cache location to reuse the first cache location for storing other data. When the attribute has the second setting, processing performed for cache management of the cache may remove the location metadata from a first cache location to reuse the first cache location for storing other data. The first location may be a logical location on a logical device having storage provisioned on one or more physical devices of a data storage system.

In accordance with another aspect of the invention is a system comprising: a processor; and a memory comprising code stored thereon, that when executed, performs a method of processing I/O operations comprising: receiving, from a requester, a read operation to read first data from a first location; determining whether the read operation is a read miss and whether non-location metadata for the first location is stored in cache; and responsive to determining that the read operation is a read miss and that the non-location metadata for the first location is not stored in cache, performing first processing including: issuing concurrently a first read request to read the first data from physical storage and a second read request to read the non-location metadata for the first location from physical storage.

In accordance with another aspect of the invention is a computer readable medium comprising code stored thereon, that when executed, performs a method of processing I/O operations comprising: receiving, from a requester, a read operation to read first data from a first location; determining whether the read operation is a read miss and whether non-location metadata for the first location is stored in cache; and responsive to determining that the read operation is a read miss and that the non-location metadata for the first location is not stored in cache, performing first processing including: issuing concurrently a first read request to read the first data from physical storage and a second read request to read the non-location metadata for the first location from physical storage. Metadata including the non-location metadata for the first location and location metadata for the first location may be stored on physical storage that is a form of non-volatile memory and the cache may be a form of volatile memory providing faster access to stored data than the non-volatile memory. The first processing may further includes responsive to receiving the non-location metadata requested by the second read request and receiving the first data requested by the first read request, performing data validation of the first data using at least some of the non-location metadata; and responsive to the data validation completing successfully, storing the first data in the cache and returning the first data to the requester. Determining whether the read operation is a read miss may use the location metadata for the first location. Prior to determining whether the read operation is a read miss and determining whether non-location metadata for the first location is stored in cache, the method includes performing other processing including determining whether the location metadata for the first location is stored in cache; and responsive to determining the location metadata for the first location is not in cache, obtaining the location metadata from physical storage and storing the location metadata in the cache. Responsive to determining the location metadata for the first location is not in cache, another request may be issued to read a location metadata chunk from physical storage. The location metadata chunk may include the location metadata for the first location and additional location metadata for one or more other locations and wherein the location metadata chunk may be stored in the non-volatile memory. The first location may be identified using a logical device and first offset location on the logical device. The additional location metadata may include other location metadata for another offset location logically following the first offset location.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
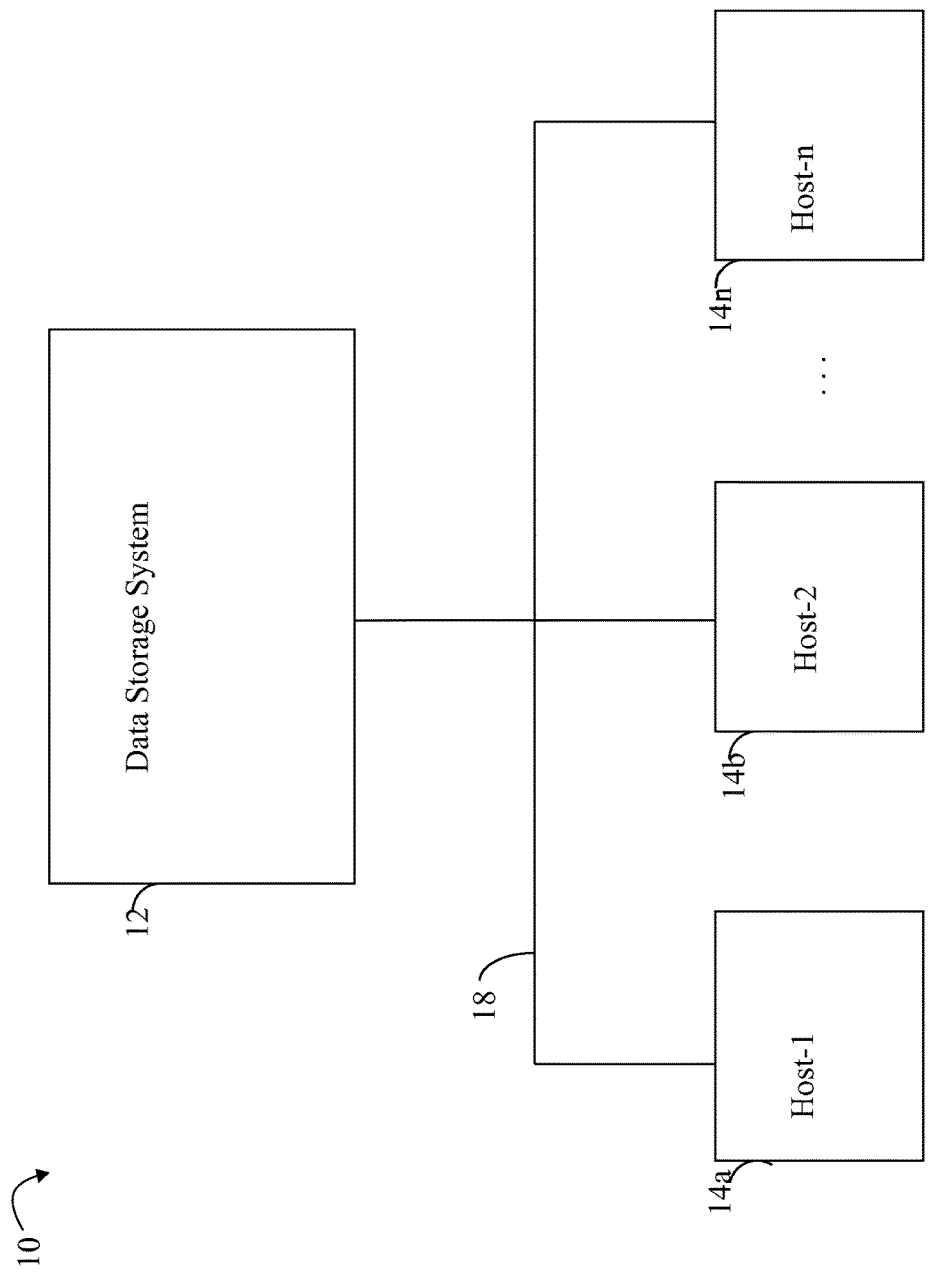
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix® VMAX® data storage system, as well one or more other data storage systems as may vary with the embodiment.

Figure 2A:
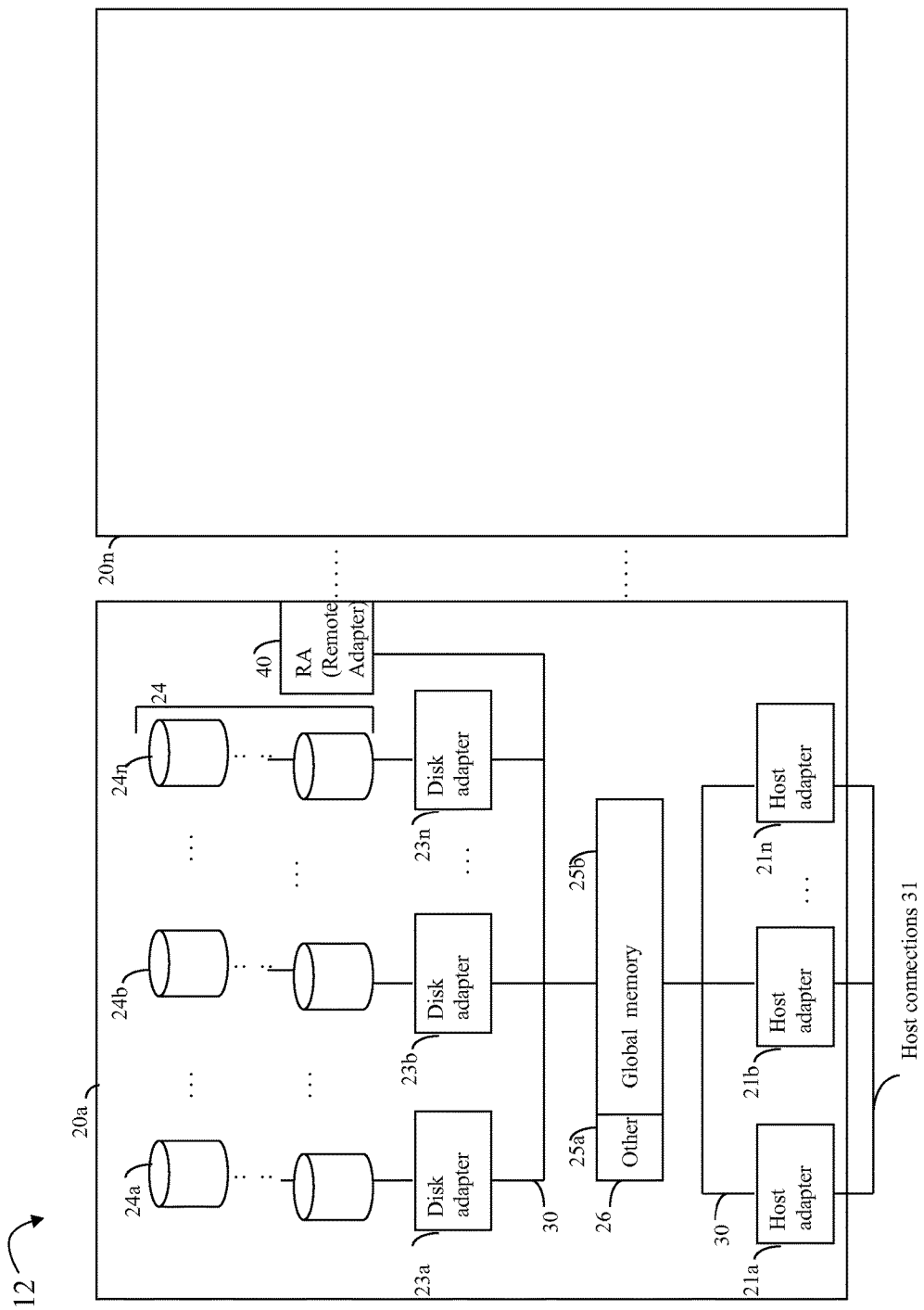
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n. In this arrangement, each of the n groupings of disks may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system such as by EMC Corporation, a backend DA may also be referred to as a disk controller. The DA may performed operations such as reading data from, and writing data to, the physical devices (e.g., physical storage devices also referred to as PDs) which are serviced by the DA.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems such as by EMC Corporation, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

The DA performs I/O operations on a disk drive. Data residing on a disk drive may be accessed by the DA following a data request in connection with I/O operations that other directors originate.

It should also be noted that a DA may also be a controller providing access to external physical drives or storage devices located on one or more external data storage systems rather than local physical drives located in the same physical storage system as the DA (such as illustrated in FIG. 2A).

Figure 2B:
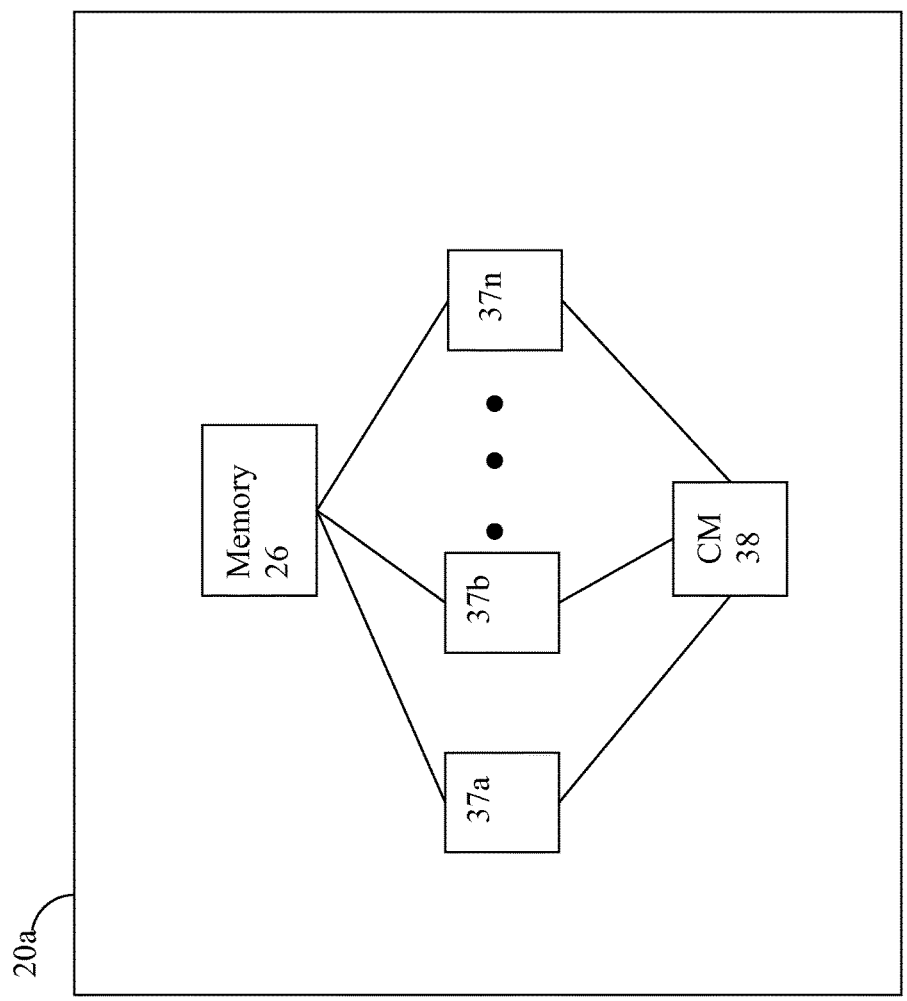
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

Figure 3:
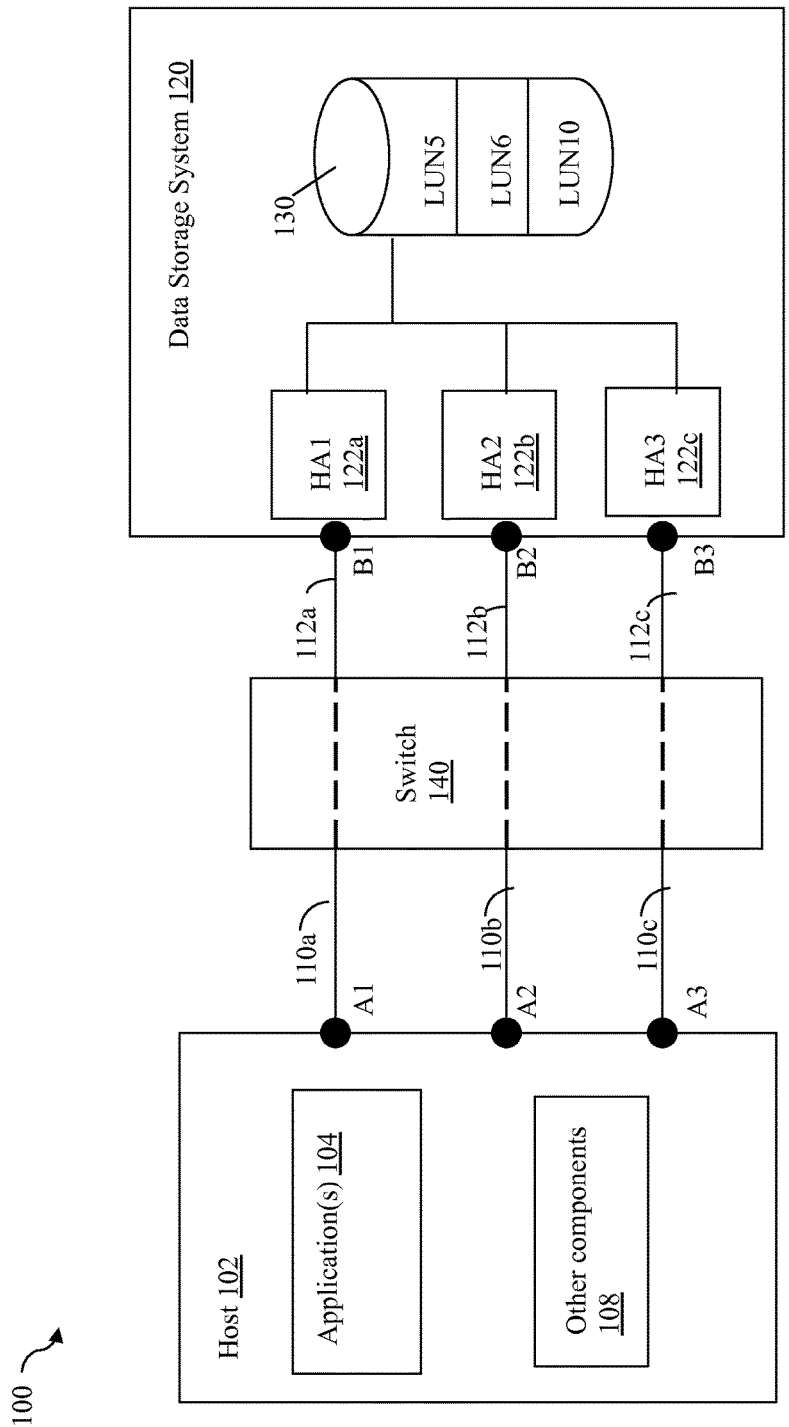
FIG. 3 is an example of a system that may be used in connection with techniques herein.

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical storage device of the data storage system 120, such as a rotating disk drive, flash-based storage device, and the like, where the physical storage device 130 may be configured to include 3 LUNs-LUN5, LUN6 and LUN10. It should be noted that the example 100 includes only a single host, single physical device 130 with 3 LUNs, a single data storage system, and a fabric including a single switch for purposes of simplicity to illustrate the techniques herein. For example, each of the LUNs may be configured to have storage provisioned from multiple different physical devices rather than a single physical device, and multiple hosts having multiple applications executing thereon may communicate with the data storage system.

The host 102 may include one or more applications 104 and other components 108 whereby element 108 may include, for example, one or more other device drivers and other code. An I/O operation from the application 104 may be communicated to the data storage system 120 using one or more other components represented by element 108. The application 104 may be a database or other application which issues data operations, such as I/O operations, to the data storage system 120. Each of the I/O operations may be directed to a target device, such as one of the LUNs of device 130, configured to be accessible to the host 102 over one or more physical paths. As such, each of the I/O operations may be forwarded from the application 104 to the data storage system 120 over one of the possible multiple paths.

The host 102 may also include other components 108 such as one or more other layers of software used in connection with communicating the I/O operation from the host to the data storage system 120. For example, element 108 may include Fibre Channel or SCSI drivers, a logical volume manager (LVM), and the like. It should be noted that element 108 may include software or other components used when sending an I/O operation from the application 104.

The data storage system 120 may include one or more physical data storage devices, such as device 130, where each such physical device may be configured to store data of one or more LUNs as described above. Each of the LUNs having data stored on the device 130 may be configured to be accessible to the host through one or more paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g. such as a port of an HBA), and elements B1, B2 and B3 each denote a port of an HA of the data storage system 120. Each of the LUNs of the device 130 may be accessible over three paths—a first path represented by A1-B1, a second path represented by A2-B2 and a third path represented by A3-B3.

Figure 4:
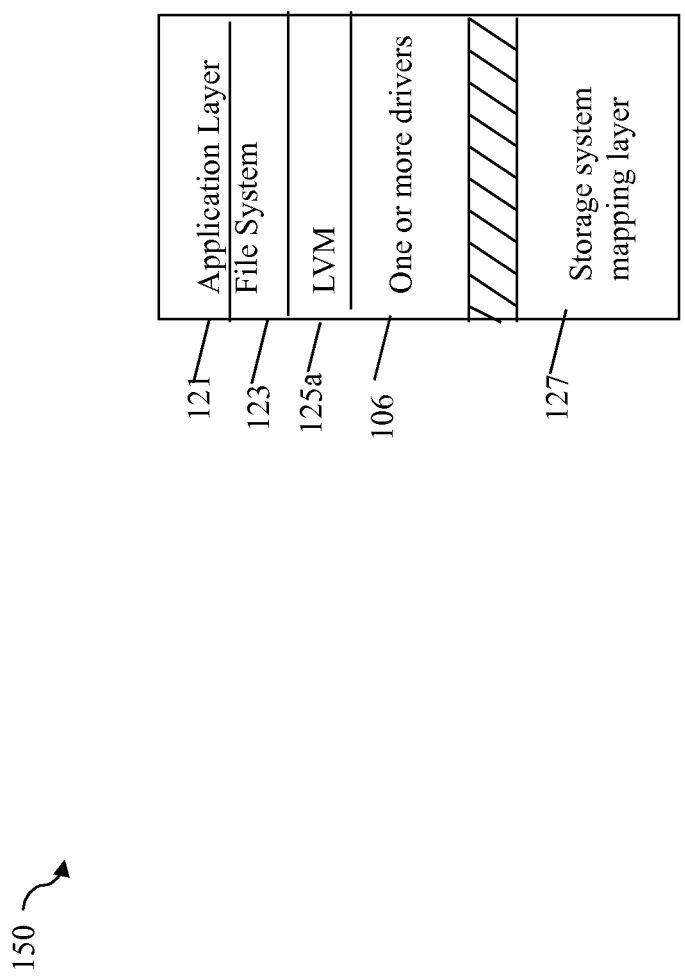
FIG. 4 is an example of different software layers that may be included in a host and data storage system in an embodiment in accordance with techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with performing a data operation request issued by a host to a data storage system such as illustrated in FIG. 3. The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be one or more drivers 106 which handle processing of the I/O received from layer 125a. The one or more drivers represented by 106 may include, for example, a SCSI driver (e.g., performs processing for sending requests and receiving responses in accordance with the SCSI standard), a hardware driver (e.g., a driver for an HBA of the host which sends commands or requests to the data storage system and also receives responses and other communications from the data storage system), and the like. Generally, one or more layers between the application layer 121 and the one or more drivers 106 may provide for mapping a LUN (such as used in connection with block-based storage) presented by the data storage system to the host to another logical data storage entity, such as a file, that may be used by the application layer 123.

In some embodiments, the data storage system 120 may be an intelligent data storage system having its own mapping layer 127 such that the LUN known or exposed to the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, multiple physical drives, and the like. In other embodiments, the data storage system may not include such a mapping layer 127.

In operation, an application executing at application layer 121 may issue one or more I/O operations (e.g., read and write operations) to logical volumes (implemented by the LVM 125a) or files (implemented using the file system 123) whereby such I/O operation may be then mapped to data operations directed to LUNs of the data storage system. Such I/O operations from the application layer 121 may be directed to the drivers 106 after passing through any intervening layers such as layers 123 and 125a.

In connection with an embodiment in accordance with techniques herein, communications between an initiator port of the host and a target port of a data storage system (e.g., target port of an HA) may include those related to I/O operations and other non-I/O commands such as related to host control operations. I/O operations may include, for example, read and write operations.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator through the target port of the data storage system.

In connection with a data storage system such as described herein, an I/O request may be a read request to read data. The read request may be received at the data storage system at a port of a front-end component of the data storage system (such as one of the HAs as described elsewhere herein). In terms of processing a read request, a determination may be made as to whether all the requested read data is in cache (e.g., a cache hit). If so, the read request may be characterized as a read hit. In such cases of a read hit, the front-end component, such as the HA, receiving the read request may service the read request by retrieving all requested read data from the cache and returning the requested read data to the host. If all the requested read data is not in cache, the read may be characterized as a read miss (e.g., cache miss) whereby processing is performed to retrieve from physical storage any portion of the requested data that is not currently in cache. As described above, one or more DAs may perform processing to retrieve from physical storage any portion of the requested data not currently in cache. Once all the requested read data is in cache, the front-end component, such as the HA, receiving the read request may service the read request by retrieving all requested read data from the cache and returning the requested read data to the host. In this manner, a front-end component may service read requests using data that is already stored in cache prior to processing the read request, as well as using data that is brought into cache from physical storage responsive to receiving the read request.

Storing such data in cache is performed with the goal of servicing subsequent I/Os using cached data without having to retrieve the data from physical storage. In an embodiment in accordance with techniques herein, processing may be performed as just described to unconditionally cache reads as a result of a cache miss and to execute a dependent sequence of steps whereby the DA writes read miss data (retrieved from physical storage) to cache and the HA then retrieves the requested data from the cache to return to the requesting host.

Figure 5A:
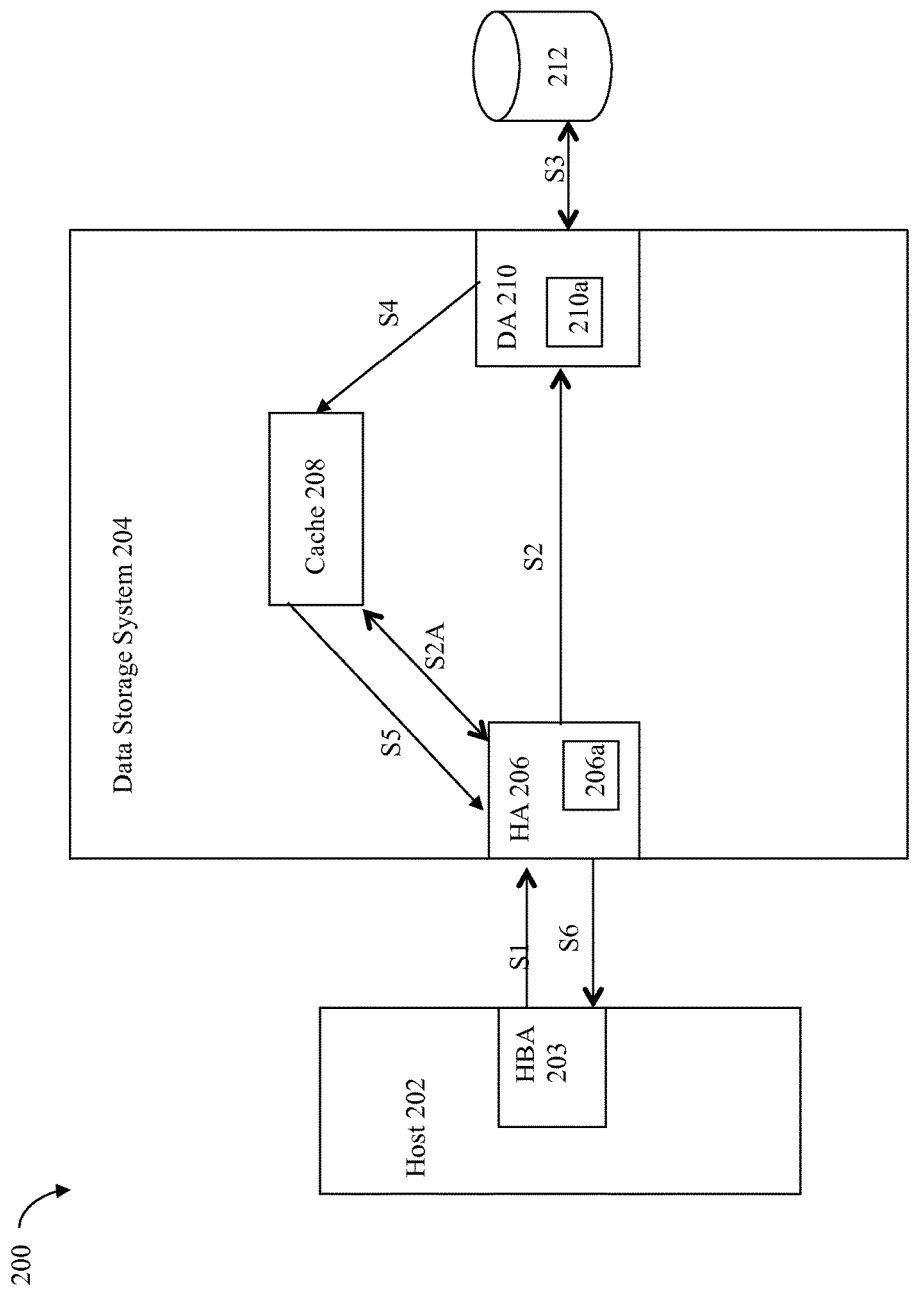
FIG. 5A is an example illustrating processing flow between components of a system in an embodiment in accordance with techniques herein.

Referring to FIG. 5A, shown is an example of a system illustrating processing that may be performed in connection with servicing a read operation in accordance with techniques herein. The example 200 includes host 202 and data storage system 204. The host 202 includes HBA 203. The data storage system 204 includes a front end component, HA 206, which receives I/Os from the host 202. The data storage system 204 also includes DA 210, cache 208 and non-volatile physical storage device 212, such as back-end disk or flash-based drive. Generally, the host 202 and data storage system 204 may include components as described in more detail in connection with other figures herein. Details of other components of 202, 204, and connections therebetween, have been omitted for simplicity of illustration. The cache 208 may be a global data cache used by and between the different components of the system 204, such as by the HAs, DAs, and other components of the system 204 as described herein. Thus, data in the cache 208 may be read from, and/or written to, by different components of the system 204 such as for use with techniques herein as well as other purposes that may vary with embodiment. In one embodiment such as illustrated in FIG. 2A, the cache 208 may be a portion of global memory of the data storage system 204. The HA 206 includes a local memory or buffer 206a used exclusively by the HA 206. For example, if the HA 206 is included on a chip or board of the system 204, element 206a may represent a form of memory included locally on the chip or board accessible only to the HA 206. In a similar manner, the DA 210 may include a local memory or buffer 210a.

As a first step S1, the host 202 sends an I/O request, such as a read request, to the data storage system 204. The read request may be received by HA 206. The HA 206 determines whether all the requested read data is in cache 208 thereby indicating that the read request is a read hit, or otherwise, that the read request is a read miss. If the read request is a read hit indicating that the read request may be serviced using data already in cache 208, the HA 206 retrieves the read request data from the cache 208 in step S2A and returns the requested read data to the host 202 in step S6. Alternatively, if the read request is a read miss, processing may be performed as described in more detail below. The HA 206 may request S2 that a back-end component, such as the DA 210, retrieve the requested data from physical storage device 212. It should be noted that in performing S2, whereby the HA 206 issues the request for the DA 210 to retrieve the requested read data, such a request may be communicated or issued to the DA 210, directly or indirectly, in any suitable manner that may vary with the embodiment of the data storage system. For example, the request may be communicated indirectly, such as through global memory, communicated directly from the HA to the DA such as a through a messaging layer and associated fabric, and the like. In any case, the DA 210 retrieves the requested read data from physical storage device 212 in step S3. The DA 210 may store the read data in a local memory 210a. The requested read data may then be transmitted from 210a of the DA 210 in step S4 to the cache 208. The requested read data is then retrieved by the HA 206 from the cache 208 in step S5. The read data received by the HA 206 in S5 may be stored in local memory 206a of the HA 206. The HA 206 may then return the requested read data to the host 202 in step S6.

In connection with servicing a read operation as received in FIG. 5A, and more generally, I/O operations as well as other processing, a data storage system may utilize metadata (MD) which may be generally characterized as data related to user data. Such user data may be data that is read by a requester, such as a host issuing I/O operations to the data storage system. As described in more detail below, the user data and related MD may be stored on back-end non-volatile storage, such as back-end physical storage devices accessed by the DA. As described below in more detail, portions of user data and related MD may also be stored in a form of faster memory, such as the cache, of the data storage system.

Figure 5B:
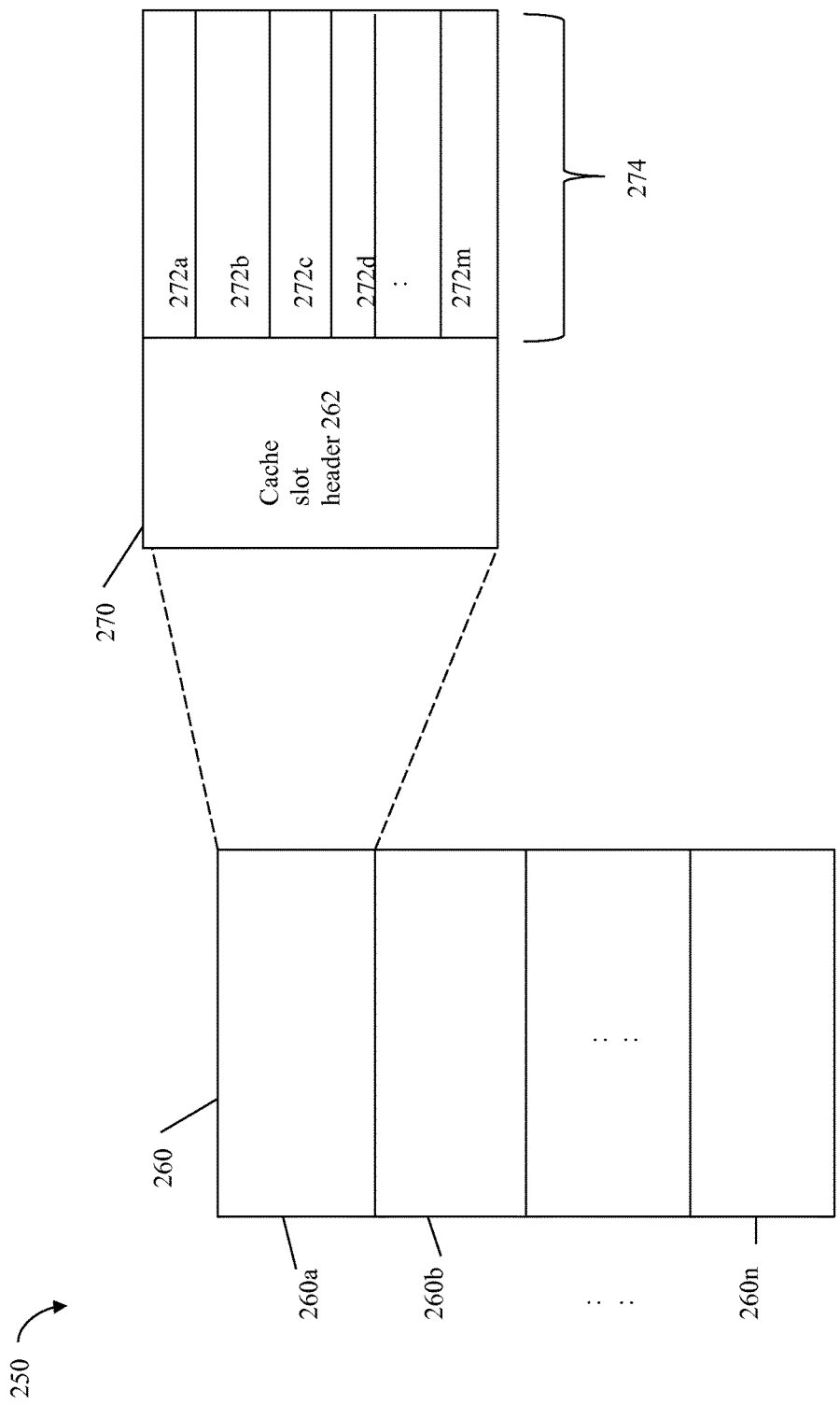
FIG. 5B is an example illustrating a logical representation of a cache in an embodiment in accordance with techniques herein.

Referring to FIG. 5B, shown is an example illustrating a logical representation of a cache that may be used in an embodiment in accordance with techniques herein. In the example 250, element 260 may represent the memory or storage used as the cache which is partitioned into cache slots 260a-260n. It should be noted that the example 250 is a logical representation of a cache that may be implemented using any suitable data structure(s) known in the art. Each of the cache slots 260a-n may contain varying amounts of write pending data. Consistent with description elsewhere herein, write pending data may be user data received in connection with a write operation where the user data has been stored in cache and is waiting to be destaged or written out to physical storage (e.g., element 212 of FIG. 5A) from cache. Element 270 provides additional detail of single cache slot 260a. Cache slot 260a may include a cache slot header 262 and cache slot data 274. The cache slot data 274 illustrates that a single cache slot of data may further include multiple portions 272a-m each of which may or may not include write pending data and each of which may or may not include any cached data. The cache slot header 262 may include additional information regarding the cached data stored in 274. For example, the header 272 may denote whether the data cached in each of the portions 272a-m is write pending data.

It should be noted that the particular granularity or smallest unit of storage for storing cached data may vary with embodiment. For example, each of the portions 272a-m may denote a smallest unit of storage for storing cached data. Additionally, the particular number of portions in a cache slot may also vary with embodiment.

Although not illustrated in FIG. 5B for simplicity and as known by those of ordinary skill in the art, an embodiment may store additional information for each of the cache slots regarding the data stored in area 274 of each such cache slot. For example, for a particular LUN and offset, such additional information may map the particular LUN and offset to a cache location containing the data for that LUN and offset. Such additional information may also, for example, map a particular PD and PD offset to a cache location containing the data for that PD and offset. Generally, such additional information may be stored in any suitable location and used, for example, by the HA, DA and other data storage system components and executing code, as an index to map into the cache 260 to retrieve and/or store data from the cache. For example, the HA may manage and/or use information mapping a LUN and LUN offset to a cache location including data stored at the LUN offset on the particular LUN. The DA may manage and/or use information mapping a PD and offset on the PD to a cache location including data stored at the offset on the particular PD. In one embodiment, for example, the foregoing mapping of a LUN location so its physical device location may be included in the location information of MD associated with user data described in more detail elsewhere herein. Additionally, in one embodiment, the size of the area 274 denoting the amount of cached data, such as user data, of a single cache slot may be 128 K bytes.

In one embodiment, the user data may be arranged in units of storage, such as tracks of a LUN where each track is of a particular size, such as 128 Kbytes of user data per track. For each track, there may exist user data and associated MD.

The MD may be generally partitioned into multiple categories. In one embodiment, the MD categories may include:

1. Location information. Location information may include, for example, the physical device storage location denoting where the user data is stored on physical storage such as disks or flash-based non-volatile storage. Location information may include, for example, cache location information denoting if the user data is stored in cache and if so, identify the location in the cache where the user data is stored.

2. Data Description. Data description information may include, for example, a checksum or other information describing the user data. For example, the checksum may be used to verify or validate the user data's validity when read from physical non-volatile storage, for example, to ensure there has not been user data corruption or error in connection with obtaining the user data from the physical storage. Use of a checksum in data validation and error detection is known in the art. A checksum is a count of the number of bits in a transmission unit that is included with the unit so that the receiver can check to see whether the same number of bits arrived. If the counts match, processing may determine that the complete transmission was received and there has been no error in the data transmitted.

3. Advanced functionality. Advanced functionality MD may relate to other data facilities or services. For example, an embodiment may support remote data replication such as, for example, the Symmetrix Remote Data Facility (SRDF®) products provided by EMC Corporation of Hopkinton, Mass. SRDF® is a family of products that facilitates the data replication from one Symmetrix® storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) for use in an embodiment in connection with techniques herein.

Data storage device communication between Symmetrix™ data storage systems using the SRDF® product is described, for example, in U.S. Pat. Nos. 5,742,792, 5,544,347, and 7,054,883, all of which are incorporated by reference herein. With the SRDF® product, a user may denote a first storage device, such as R1, as a master storage device and a second storage device, such as R2, as a slave storage device. Other incarnations of the SRDF® product may provide a peer to peer relationship between the local and remote storage devices. For example, the host may interact directly with the device R1 of first local data storage system, but any data changes made are automatically provided to the R2 device of a second remote data storage system using the SRDF® product. In operation, the host may read and write data using the R1 volume in the first data storage system, and the SRDF® product may handle the automatic copying and updating of data from R1 to R2 in second remote data storage system. The SRDF® replication functionality may be facilitated with the RAs provided at each of the foregoing first and second data storage systems. Performing remote data communications using the SRDF® product over a TCP/IP network is described in more detail in U.S. Pat. No. 6,968,369, Nov. 22, 2005, Veprinsky, et al., REMOTE DATA FACILITY OVER AN IP NETWORK, which is incorporated by reference herein.

The advanced functionality MD may denote, for example, whether the user data is replicated by such a data facility such as the SRDF® product, whether the remote or replication copy of the user data is valid or up to date with the primary location copy of the user data, and the like.

Since the MD, such as the location information MD and the checksum or other information of the data description MD, may be needed in connection with servicing I/O operations, the MD may be stored in a form of fast memory or storage. For example, an embodiment may store the MD for as many user data tracks as possible in cache 208, such as a DRAM cache of the data storage system. Thus, storing the MD in cache or other form of fast storage provides for obtaining needed MD, such as location MD, in a timely manner to service I/O operations and other processing in connection with the associated user data.

In one embodiment, the MD as well as the associated user data may be stored on non-volatile back-end storage, such as a rotating disk drive or a flash-based physical storage device accessed by the DA. A copy of the MD may also be stored in the cache 208 that is a form of volatile memory for use as described herein. Thus, the MD may be stored on a form of non-volatile memory, such as backend physical storage, that is typically slower in terms of performance than the volatile memory used as the cache.

As noted above and elsewhere herein, the data storage system may use MD, such as the location information MD, to determine where user data resides on the permanent non-volatile physical storage devices (e.g., as represented by element 212 such as rotating disks, flash-based devices, and the like). With reference back to FIG. 5A, upon receiving a read operation from the host or other requester in S1, all the MD associated with the read operation may be read from physical storage by the DA if such MD is not already in the cache. Once all the MD for the user data requested is currently stored in cache, the data storage system may use the location MD for the user data requested by the read operation to determine whether the requested user data is currently in cache 208 (e.g., resulting in a cache or read hit), or not (e.g., resulting in cache or read miss). If the user data requested by the read operation is not in cache, the data storage system may further allocate a cache location in the cache 208 for storing the requested read miss data, and, using the location MD, obtain the requested read miss user data from its physical device storage location (S3) which is then stored in the allocated cache location (S4). Once the read miss data is read from physical storage in step S3, additional processing may be performed, for example, such as data validity processing, where the user data just read by the DA from back-end physical storage is validated, such as using a checksum or other non-location MD information (e.g., such as included in the data description MD category described above or non-location MD classification described below). Once data validation is complete and successful, the requested read miss data may be stored in cache 208 in step S4 and then obtained by the HA 206 in step S5 to be returned to the host in step S6.

Generally, the amount of MD describing all user data, such as stored on LUNs configured in a data storage system, is large in size. Modern storage systems are capable of storing a large amount of user data and therefore a large amount of MD is needed to describe such user data. Additionally, the complexities of the modern data storage system, such as due to the available data services, may define a feature set requiring a lot of MD to describe each user data track. In some cases, the amount of user data and associated MD make it impractical to store all MD for all user data in cache. In other words, the size of the cache is typically smaller than the amount of cache needed to store all the MD along with storing other necessary data in cache. In this case, a data storage system may use a paging mechanism for storing MD in cache.

Paging is generally known in the art and commonly used in connection with memory management, such as for virtual memory management. In connection with virtual memory management, paging is a method of writing data to, and reading it from secondary storage, such as physical disk or other non-volatile storage, for use in primary storage, such as main memory. In a memory management system that takes advantage of paging, the operating system reads data from secondary storage in blocks or chunks that may also be referred to as pages. Since the amount of the primary storage is typically much smaller than the amount of data on secondary storage, it is not possible to store all such data in the primary storage. Thus, data may be read from secondary storage and stored in the primary storage as needed. When the primary storage no longer has available locations and another primary storage location is needed for storing new or additional data not already in primary storage, techniques may be used to select a primary storage location whereby any data in the selected primary storage location may be overwritten with the new or additional data. Prior to overwriting the selected primary storage location with the new or additional data, the current data of the selected primary storage location may be written out, as needed, to its corresponding secondary storage location (e.g., written out if the primary storage location copy is more recent or up to date than the secondary storage copy). In such a case, the current data in the selected primary location may be characterized as paged out of the primary memory (e.g., available on secondary storage but not primary storage) and the new or additional data may be characterized as paged in to the primary memory. The new or additional data is also stored on the secondary storage.

In connection with storing MD in the cache in an embodiment of a data storage system, paging may be performed in a similar manner where the primary storage is the cache and the secondary storage is the physical storage device (e.g., disk or flash-based non-volatile backend storage accessed by the DAs). Thus, MD may be retrieved from back-end physical storage as needed and stored in cache, such as for servicing read operations requesting user data associated with the MD. Once the MD is in cache, such MD may be removed from cache (e.g., evicted, removed, overwritten, and the like) as cache locations storing such MD are needed in connection with other processing.

It should be noted that storing the MD on back-end physical storage which is read and/or written to physical storage by the DA is one possible way in which an embodiment in accordance with techniques herein may store and access MD on a form of non-volatile storage. More generally, an embodiment may store the MD on any form of non-volatile storage and access such MD as needed in any suitable manner. For example, in at least one other embodiment in accordance with techniques herein, the MD may be stored on a non-volatile storage that is a form of flash-based physical storage included in memory cards, such as flash SLICs, of the data storage system. In such an other embodiment, each of the directors or adapters (e.g., HAs, DAs, etc.) may access MD as needed from the flash SLICs. For example, each HA and DA may access the MD from a flash SLIC as needed by directly accessing the flash SLIC rather than obtaining such needed MD through the DA (as in the former embodiment noted above). Thus, for purposes of illustration, following paragraphs may refer to one particular embodiment in which the MD is stored on non-volatile back-end storage and retrieved by the DA. However, it will be appreciated by those skilled in the art that techniques described herein are not so limited to embodiments described herein for purposes of illustration and example.

In some data storage systems not utilizing techniques described herein, for a user data portion such as a track of user data, all the related MD (e.g., all of the MD for all 3 categories described above) may be either located in cache or none of the related MD may be located in cache. Thus, in such systems not using techniques herein, the MD for user data may be accordingly all paged in or all paged out of cache as a single unit. As a result, when a read request is received and the related MD for the requested read data is currently paged out or not in cache, servicing the read (e.g., read hit or miss) first requires reading the associated MD into cache (e.g., page in the associated MD) to determine whether the requested read data is in cache or not. Additionally, if the requested read data is not in cache and is therefore a read miss, the MD is further needed to determine the back-end physical storage location from which to obtain the read miss data, perform data validation, and the like. Thus, I/O processing and performance, such as for read processing, may be adversely impacted when the MD related to the user data of such I/Os is not currently in cache (e.g., MD is paged out of cache).

An embodiment may use techniques described herein in following paragraphs to minimize the adverse I/O performance impact of paging MD into cache such as may be performed in connection with servicing a read miss I/O operation when the MD needed for servicing the read miss is not currently in cache. As described in more detail below, the MD for a track or other user data portion may be generally partitioned into two classifications. A first MD classification may include only the location information category MD as described elsewhere herein. The second MD classification (also referred to as non-location MD) may generally include all remaining MD information, such as the data description MD and advanced functionality MD categories described elsewhere herein. As described in more detail in following paragraphs, location MD for selected LUNs may be cache-resident and not subject to being paged out. Additionally, for a read miss where the non-location MD for the read miss data is also not currently in cache, processing may be performed to concurrently issue (e.g., substantially at the same time and in parallel) read requests to the DA to retrieve from physical storage both the read miss data and the non-location MD for the read miss data.

In one embodiment in accordance with techniques, the location information category of MD, the first classification of location MD, may be stored in cache for all active configured LUNs (e.g., LUNs which are "in use" such as for a defined activity period when it is known that I/O operations will be directed to such LUNs). In accordance with a first policy implemented in one embodiment, such location MD of the first classification for all active LUNs may not be paged out (e.g., may remain resident in cache). However, non-location MD of the second classification for user data of active LUNs may be paged out and not remain resident in cache. For example, the cache resident location MD may include location MD of active LUNs used by an application, process or data service currently executing (or about to commence execution) on the data storage system. The foregoing and other features of techniques herein are described in more detail in following paragraphs.

Figure 6:
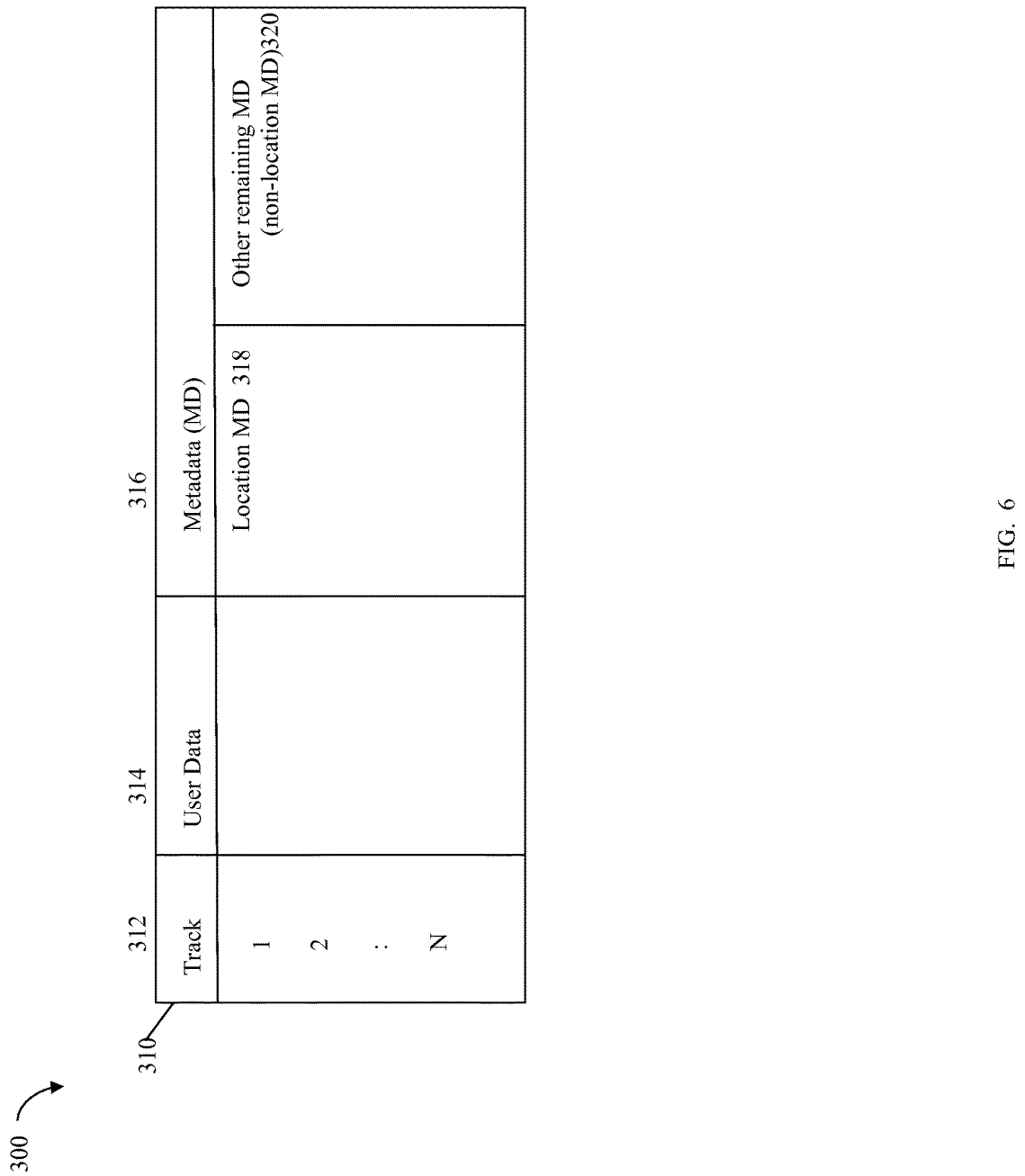
FIGS. 6 and 7 are example illustrating user data and associated metadata that may be used in an embodiment in accordance with techniques herein.

Referring to FIG. 6, shown is an example of a logical representation of user data and associated MD in an embodiment in accordance with techniques herein. The example 300 illustrates information that may be stored and maintained in an embodiment in accordance with techniques herein. For example, assume LUN A includes N tracks of user data and table 310 may denote a logical representation of information stored in connection with LUN A. Column 312 denotes the N tracks. Column 314 denotes the user data for each of the N tracks. Column 316 denotes the MD for the N tracks of user data in column 314. Additionally, consistent with description elsewhere herein, the MD 316 is further partitioned into two classifications—location MD 318 and all other remaining MD (also referred to as non-location MD) 320.

The information of 310 may be stored, for example, in one or more other suitable arrangements. For example, as will be described in more detail below, an embodiment may store both the user data 314 and associated MD 316 on physical non-volatile storage (e.g., back-end physical storage devices such as rotating disk drives or flash-based drives as indicated by the location MD). As I/O operations directed to various locations on LUN A are issued, the cache may become populated with various tracks, or portions thereof, of user data 314. Additionally, the cache may be populated with various portions of the MD 316 as described in more detail below.

Figure 7:
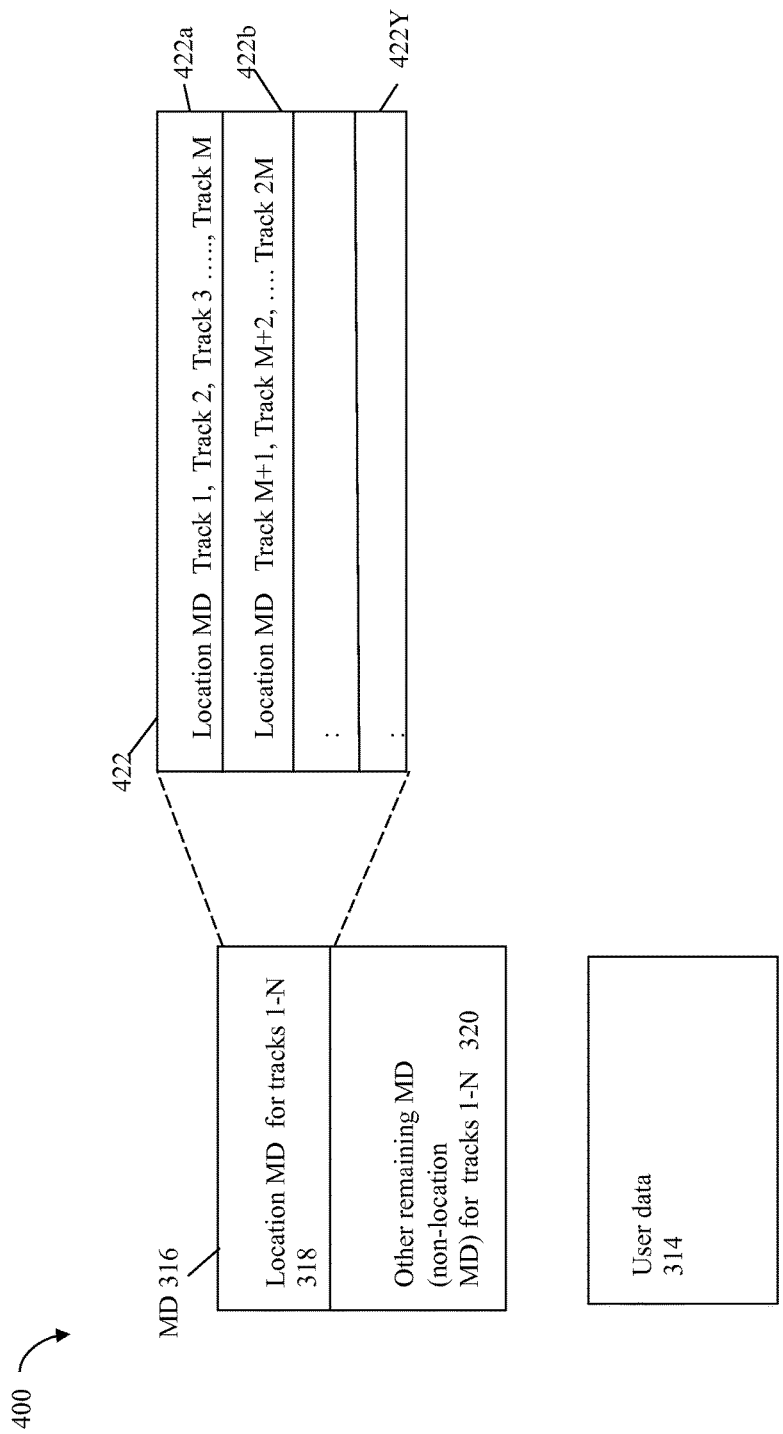

Referring to FIG. 7, shown is an example illustrating one arrangement of the user data and associated MD in an embodiment in accordance with techniques herein. The example 400 illustrates one way in which the user data and MD may be organized and stored on physical non-volatile storage of the back-end for the single LUN A. In at least one embodiment, the user data 314 of LUN A may be stored and organized as a first grouping of information separate from the associated MD 316. The MD 316 may further be arranged such that the location MD 318 for tracks 1–N is stored as a first portion followed by other remaining non-location MD 320 for tracks 1–N.

Element 422 further illustrates how the location MD 318 may be further arranged Element 422 includes Y chunks 422a-422Y of location MD where each of the Y chunks includes location MD for M tracks. For example, location MD chunk 422a includes location MD for tracks 1–M, location MD chunk 422b includes location MD for track M+1 through track 2M, and so on. In one embodiment, each of the chunks 422a-422Y may be the size of a single cache slot or cache location having a size equal to the cache allocation unit. Thus, as described in more detail below, each of the chunks 422a-422Y may denote a portion of location MD for multiple tracks as may be stored in a single cache slot allocated for use in accordance with techniques herein. Thus, each chunk of 422 includes location MD for multiple tracks which are logically consecutive tracks of the same LUN. As described in more detail below, location MD may be retrieved and stored in cache in chunks so that rather than retrieve only a single track of location MD, location MD is obtained for all tracks in the same chunk. For example, if location MD is needed for track 1 and currently not stored in cache, location MD for all M tracks in 422a may be retrieved from back-end non-volatile physical storage and stored in cache.

Although the foregoing of FIGS. 6 and 7 is illustrated for a single LUN A, similar information may be stored on physical non-volatile storage of the back-end for each configured or provisioned LUN in the data storage system.

In an embodiment in accordance with techniques herein, location MD for one or more LUNs may be stored in cache and designated as cache resident whereby such location MD of the LUNs is not paged out of cache and remains in cache. Such cache resident status for the location MD of one or more LUNs may be specified for a defined time period, may always be designated as cache resident for particular LUNs, and the like, as may vary with embodiment.

Figure 8:
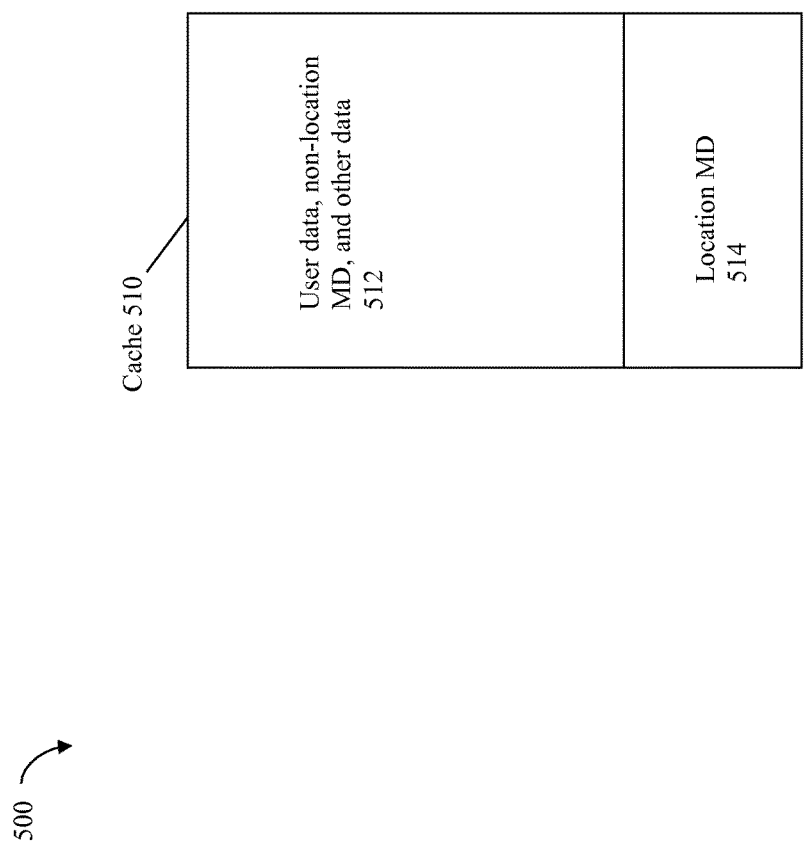
FIGS. 8 and 9 are examples illustrating metadata and user data stored in cache in embodiments in accordance with techniques herein.

Referring to FIG. 8, shown is an example illustrating information that may be stored in cache in an embodiment in accordance with techniques herein. Assuming there is a sufficient amount of cache, location MD for a set of one or more LUNs designated as active or in-use may remain cache resident. Remaining non-location MD for the set of one or more LUNs which are active is not designated as cache resident. Such non-location MD may or may not be in cache at any particular time and may be paged out of cache, for example, depending on the amount of remaining cache not storing location MD. In such an embodiment, the location MD may be stored in a portion of cache separate from other non-location MD. For example, in one embodiment, the location MD for a particular track may be stored in a first cache slot used to store multiple sets of location MD for multiple tracks of user data. If the non-location MD for the particular track is stored in cache, then the non-location MD may be stored in a second cache slot different from the first cache slot.

The example 500 includes cache 510 with a first cache portion 514 including the cache resident location MD for the active LUNs. Element 512 may denote the remaining second portion of cache used for storing user data, non-location MD and other data that may be used in an embodiment in accordance with techniques herein. The second portion 512 of the cache may include, for example, the non-location MD for the active LUNs having their location MD stored in 514 as cache resident. The location MD for a LUN may be loaded into portion 514 of the cache, for example, once a LUN becomes active, immediately prior to a designated active use period, or may be brought into cache in chunks as I/O operations directed to different portions of the LUN are received. However, the LUN's non-location MD may or may not be currently in cache may also not be marked as cache resident. Thus, information such as the LUN's non-location MD in the second cache portion 512 may be evicted, overwritten or otherwise paged out as additional cache locations of 512 are needed for processing I/O operations and/or performing other processing on the data storage system.

In one embodiment, for an I/O operation directed to a particular track of user data, location MD for the particular track may be read from the non-volatile physical storage (e.g., disk or flash-based storage) into cache if the location MD is not already in cache when the I/O operation is received. In a similar manner, non-location MD for the particular track may be read from the non-volatile physical storage (e.g., disk or flash-based storage) into cache if the non-location MD is not already in cache when the I/O operation is received. Once location MD is stored in cache for a LUN designated as active or in use, such location MD may remain resident in the cache and not subject to being paged out. In contrast, the non-location MD may be paged out of cache since it is not designated as cache resident.

In one embodiment, the location MD stored in cache portion 514 may be organized in a manner similar to that as illustrated by element 422 of FIG. 7. With reference back to FIG. 7, in one embodiment, location MD for multiple tracks may be stored in chunks such that a single chunk includes location MD for multiple tracks which may be logically consecutive tracks of the same LUN. Each chunk may be the size or granularity of a single cache slot allocated for caching data. Thus, location MD may be read from physical non-volatile storage devices into cache in chunk size units. For example, in one embodiment, assume that location MD for track 1 is needed to process a read operation directed to track 1. In response, a chunk of location MD including location MD for track 1 and also neighboring tracks may be read from physical non-volatile storage into cache. For example, the location MD for the entire chunk 422a may be read from physical non-volatile storage into cache. Thus, the location MD for track 1 may be stored in a first cache slot in cache portion 514 and the non-location MD for track 1 may be stored in a second cache slot in cache portion 512 along with at least a portion of the user data for track 1.

To further illustrate an active or in-use status associated with a LUN, consider the following. For example, a data service or facility such as backup processing may be performed where a set of LUNs on the data storage system are designated as target devices to which data is being backed up (e.g., such as backing up data stored on a host to the target LUNs, backing up data to the target LUNs from other source LUNs stored on the data storage system or elsewhere). In such a case, software for the backup data service may provide an indication or hint that backup processing is about to commence for the set of target LUNs. In response to receiving such an indication or hint prior to the backup beginning, the data storage system may perform processing to mark all location MD for the target LUNs as cache resident. Additionally, if such location MD is currently not in cache, the processing may include retrieving the location MD for the target LUNs. Thus, the location MD for the target LUNs, while active or in use such as during the backup processing, may be cache resident and may not be paged out of cache. Once the time period for backup processing has completed whereby the target LUNs are characterized as no longer active or in use, the location MD for such target LUNs may no longer be designated as cache resident and may be paged out of cache. Thus, the location MD for the target LUNs may be designated as cache resident for defined periods of active use in accordance with a backup process or defined backup schedule.

In one embodiment, each single LUN may be associated with an attribute denoting whether the LUN is active or in-use, or is otherwise inactive or not in-use. When the attribute indicates the LUN is active, the location MD for the LUN may be marked as cache resident and not subject to paging out of cache while the attribute indicates the active status. When the attribute indicates the LUN is inactive or not in use, the location MD for the LUN may not be marked as cache resident and is subject to paging out of cache. An embodiment may also or alternatively include support for associating the foregoing attribute with a defined group of more than one LUN whereby the attribute setting is applied to all LUNs in the group. In other words, rather than have the active/inactive status associated per LUN, a single attribute setting may be specified for the LUN group whereby when the attribute is active, location MD for all LUNs in the LUN group is marked as cache resident, and otherwise, when the attribute for the LUN group is inactive, the location MD for all LUNs in the group is marked as not cache resident. In a similar manner, such an active attribute may be more generally provided in a system for any suitable level of granularity which is per LUN, for a group of LUNs, and/or for portions of less than a single LUN (e.g., defined per group of tracks of a LUN). Thus, the use of such an attribute provides a way in which an embodiment may selectively and dynamically cause related location MD of one or more particular LUNs to be cache resident.

More generally, such an attribute may be set to denote whether to mark location MD of particular LUN(s) as cache resident. Varying the attribute setting based on active or inactive use time periods is one such way in which the attribute may be dynamically modified. As another variation, an embodiment may designate as cache resident one or more LUNs storing data for a particular high priority application. Thus, the foregoing attribute may be set to indicate cache residency for location MD for those LUNs based on the application priority. In one embodiment, a user may specify an associated priority for provisioned LUNs whereby if the priority specified is high, the foregoing attribute for the LUNs may indicate that the location MD for the LUNs is cache resident.

In the foregoing example of FIG. 8, the particular size of 514 may vary depending on the number of LUNs which are active or otherwise have their associated attributes set to indicate that the associated location MD for such LUNs is cache resident.

Figure 9:
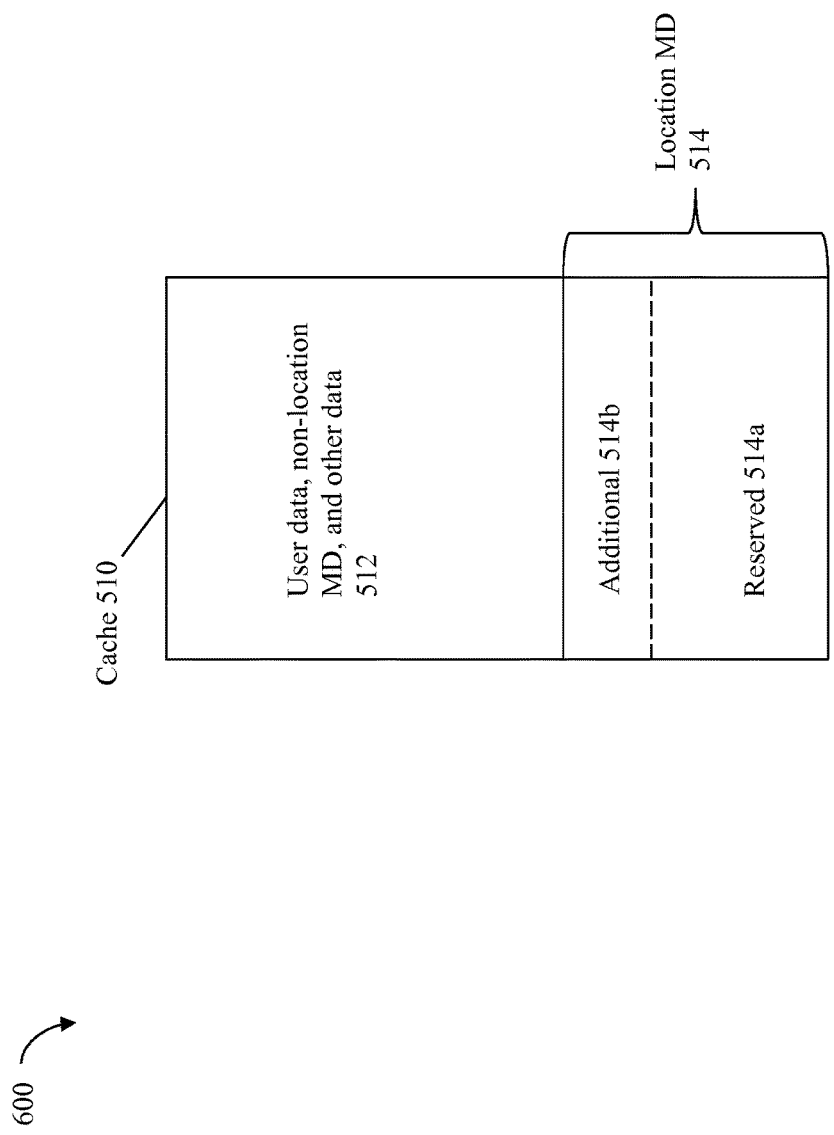

In order to ensure that at least a minimum amount of the cache is used for storing location MD, an embodiment may designate a specified amount of the cache as reserved for storing location MD as further illustrated in FIG. 9.

With reference to FIG. 9, the example 600 further illustrates the location MD 514 being stored in a reserved segment 514a and an additional segment 514b. The reserved segment 514a may denote the size of the reserved cache portion for storing memory resident location MD. In one embodiment, the reserved cache portion 514a may be used exclusively for storing memory resident location MD. As illustrated, location MD 514 may be also stored in additional segment 514b of cache besides the reserved cache portion 514a (e.g., when the amount of location MD exceeds the size of the reserved segment 514a). Thus, use of such a reserved portion of cache 514a ensures that at least the amount of location MD of the reserved portion size is cache resident and will not be paged out while the attribute(s) associated with such location MD (as stored in 514a) indicates that such location MD should be memory resident. In this example, the location MD stored in the additional segment 514b may be paged out even though the attribute(s) associated with such location MD indicates that such location MD of 514b should be memory resident. Thus, such an embodiment implement a policy where location MD may be stored in the reserved segment 514a as well as other portions of the cache 510. However, only the location MD stored in the reserved segment 514a may be guaranteed as cache resident and will not be paged out of cache. Location MD stored in the additional segment 514b may be paged out of cache as needed in connection with processing performed by the data storage system.

An embodiment may also implement a policy that the reserved segment 514a may be temporarily used for storing other data, such as non-location MD, if not all of the reserved segment 514a of cache is currently used for storing location MD. However, any other non-location MD in the reserved segment 514a will be paged out in the event that additional location MD is to be stored in cache. In other words, when there is an unused section of the reserved segment 514a whereby the unused section is not currently storing location MD, the unused section may be used for storing other information, such as non-location MD.

In an embodiment in accordance with techniques herein, a read I/O operation may be received. If the location MD for the read I/O operation is currently not in cache, processing may be performed to retrieve the location MD from physical non-volatile back-end storage into cache. It may be that the read I/O operation is a read miss for the user data and also a cache miss with respect to the non-location MD. As described herein, the non-location MD may be needed in connection with servicing the read operation such as, for example, in connection with performing data validation of the read miss data once obtained from physical storage. In order to minimize the adverse impact upon I/O performance if the read results in a read miss for the user data and further results in a cache miss with respect to the non-location MD for the requested read, an embodiment in accordance with techniques herein may concurrently issue a first read request to the DA to read the user data from the physical storage device (of the back-end) and also issue a second read request to the DA to read the non-location MD for the read miss data from the physical storage device (of the back-end).

Figure 10:
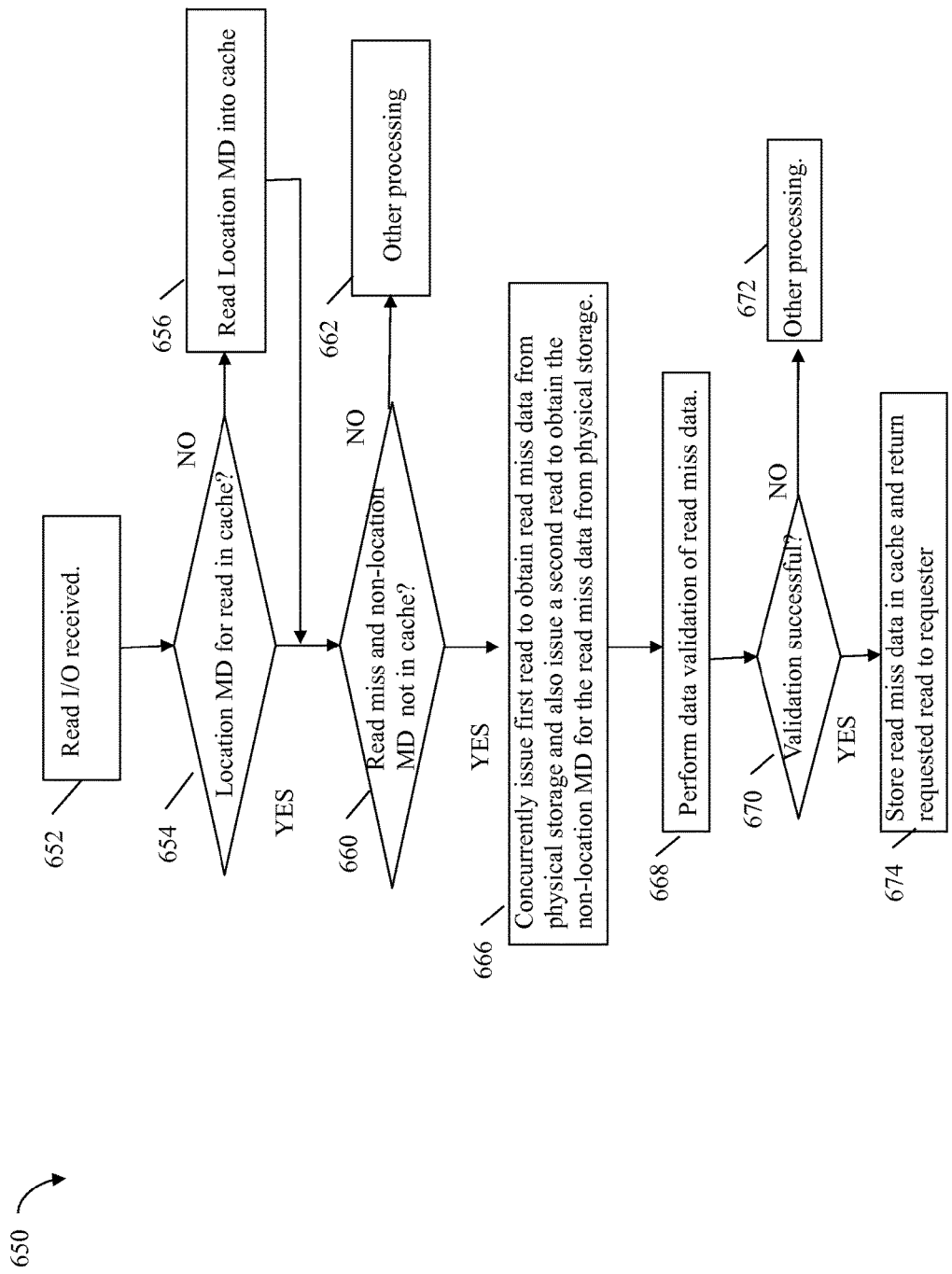
FIGS. 10, 11 and 13 are flowcharts of processing steps that may be performed in an embodiment in accordance with techniques herein.

Referring to FIG. 10, shown is a first flowchart of processing steps that may be performed in an embodiment in accordance with techniques herein. The steps of the flowchart 650 summarize processing as described herein. In step 652, a read I/O operation is received by the data storage system. The read operation may be directed to read user data located at a particular target location, such as a particular track or offset in a track, on a LUN. At step 654, a determination is made as to whether the location MD for the read target location is currently in cache. If step 654 evaluates to yes, control proceeds directly to step 660. If step 654 evaluates to no, control proceeds to step 656 to issue a request to the DA to read from physical storage the location MD and store such location MD into cache. It should be noted that step 656 may include reading into from physical storage and storing into cache other location MD of neighboring tracks. For example, as described herein, steps 656 may include reading a chunk of location MD including location MD for multiple tracks denoting a logical range of consecutive tracks of the LUN to which the read is directed. From step 656, control proceeds to step 660.

At step 660, a determination is made as to whether the current read operation is a read miss and also whether the non-location MD for the target location of the read operation is currently not in cache. If step 660 evaluates to no, control proceeds to step 662 to perform other processing to service the read operation. If step 660 evaluates to yes, control proceeds to step 666. At step 666, processing is performed to concurrently issue a first read to obtain the read miss data from physical storage and also issue a second read to obtain the non-location MD for the read operation or read miss data from physical storage. At step 668, processing may be performed to validate the read miss data obtained from physical storage. As described elsewhere herein and known in the art, such data validation processing may include, for example, performing error checking of the read miss data obtained from physical storage in connection with the first read. Such data validation may, for example, use a checksum or other information included in the non-location MD obtained in connection with the second read. Thus, the non-location MD obtained with the second read may generally include information used in connection with performing data validation of the read miss data of the first read. It should be noted that an embodiment may generally use any suitable technique and associated information in connection with data validation of the read miss data.

At step 670, a determination is made as to whether the data validation is successful. If not whereby step 670 evaluates to no, control proceeds to step 672 to perform other processing. It should be noted that step 672 may include, for example, re-reading the read miss data from physical storage and repeating data validation processing. More generally, step 672 may include any suitable error recovery, may include retrying the operation, and the like.

If step 670 evaluates to yes, control proceeds to step 674 where the validated read miss data is stored in cache and returned to the requester that issued the read operation received in step 652.

Figure 11:
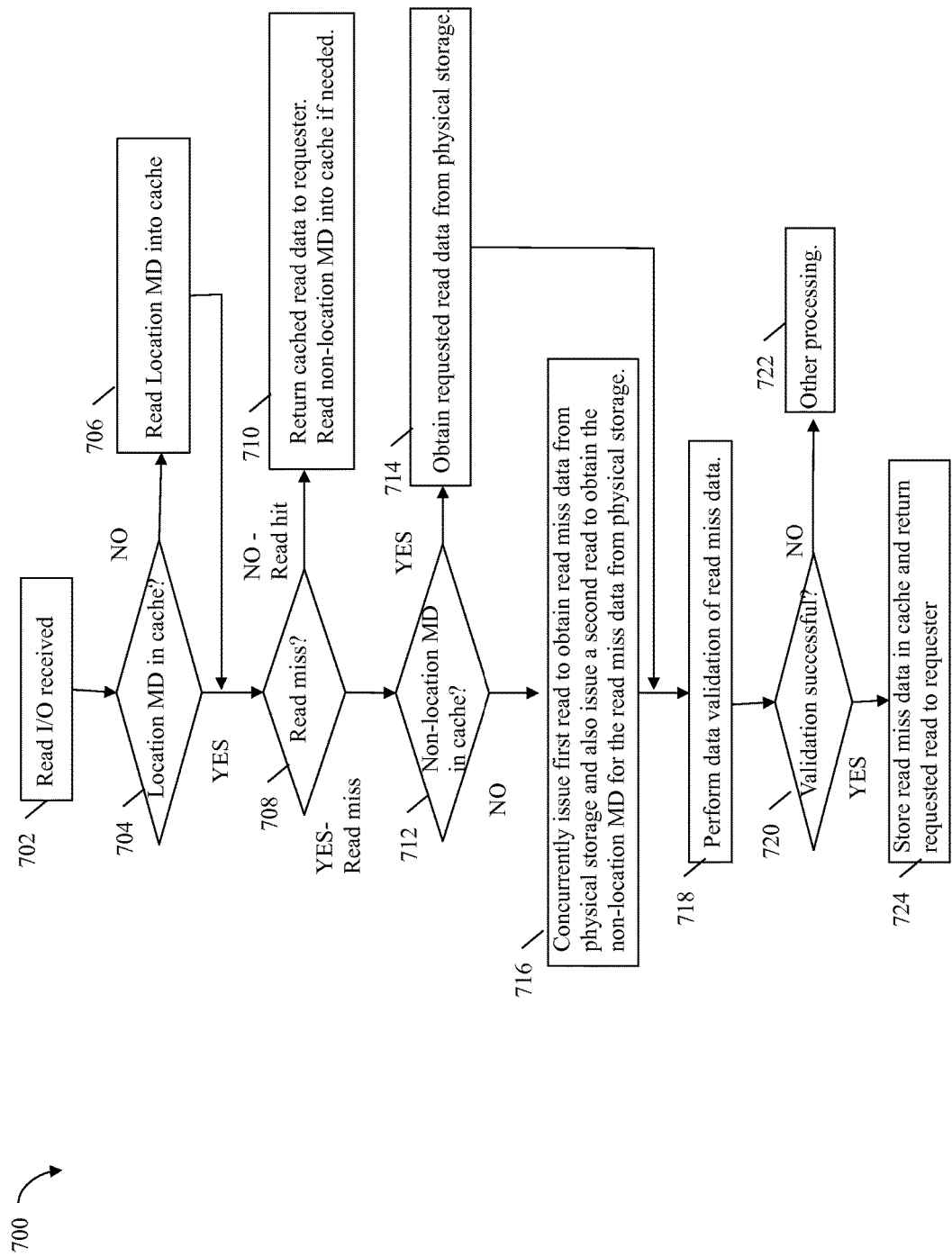

Referring to FIG. 11, shown is a second flowchart of processing steps that may be performed in an embodiment in accordance with techniques herein. The steps of the flowchart 700 summarize processing as described herein and provide further detail in connection with processing such as illustrated in FIG. 10. Generally, steps 702, 704, and 706 are respectively similar to steps 652, 654 and 656 of FIG. 10. Beginning with step 708, additional detail is provided in connection with processing steps for the read operation received. At step 708, a determination is made as to whether the read operation is a read miss. If step 708 evaluates to no meaning the read is a read or cache hit, control proceeds to step 710. At step 710, the cached read data is returned to the requester. Additionally, as part of step 710, the non-location MD may be read from physical storage into cache if needed or otherwise desired.

If step 708 evaluates to yes whereby the read operation is a read miss, control proceeds to step 712. At step 712, a determination is made as to whether the non-location MD for the read miss is currently in cache. If step 712 evaluates to yes, control proceeds to step 714 to obtain the requested read miss data from physical storage. Control proceeds to step 718.

If step 712 evaluates to no whereby there is a read miss and the non-location MD for the read miss is also not in cache, control proceeds to step 716 to concurrently issue the first read to obtain the read miss data and the second read to obtain the non-location MD for the read miss data from physical storage. Steps 716, 718, 720, 722 and 724 are respectively similar to steps 666, 668, 670, 672 and 674 of FIG. 10.

Figure 12:
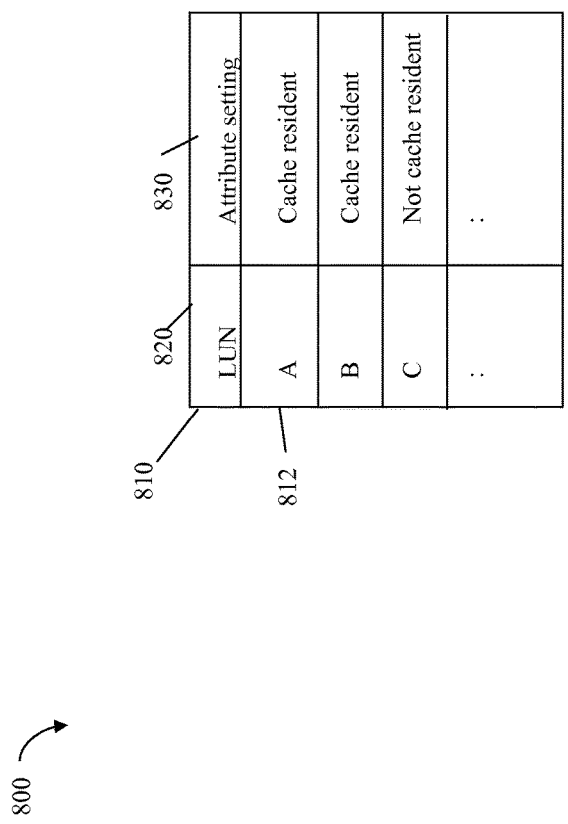
FIG. 12 is an example illustrating attribute settings that may be maintained for logical devices in an embodiment in accordance with techniques herein.

Referring to FIG. 12, shown is an example of attribute settings that may be maintained for logical devices or LUNs in an embodiment in accordance with techniques herein. The example 800 includes a table 810 of attribute settings with a first column 820 of LUNs and a second column 830 of attribute settings for each of the LUNs denoted in column 820. Each row of the table 810 identifies a current attribute setting in 830 for a LUN on 820 of the row. For example, 812*a* indicates that LUN A has an associated attribute setting of cache resident whereby location metadata for each track of LUN A is to remain cache resident once the location metadata is brought into cache. Row 812*b* indicates that LUN B has an associated attribute setting of cache resident whereby location metadata for each track of LUN B is to remain cache resident once the location metadata is brought into cache. Row 812*c* indicates that LUN C has an associated attribute setting of not cache resident whereby location metadata for each track of LUN C may not remain cache resident once the location metadata is brought into cache. Thus, LUN C location metadata may be paged out of cache as additional cache slots or locations are needed by cache management processing for performing I/O operations, and the like.

As described elsewhere herein, an embodiment may dynamically modify the values of the attribute settings in column 830 between a first setting of cache resident (indicating that associated location metadata for any track of the LUN should remain cache resident) and a second setting of not cache resident (indicating that associated location metadata for any track of the LUN is not cache resident and may be paged out of cache). Such modification may generally be performed in an accordance with any one or more suitable criteria in an embodiment. For example, as noted above, the attribute setting for a LUN may be cache resident during defined periods of use or activity where it is expected that I/O operations will be received at the data storage system for the LUN.

As also described herein, the example 800 illustrates specifying one attribute in column 830 for each LUN whereby the setting in 830 may be applied to all location metadata for any track of the LUN. More generally, a single attribute may be associated with a defined group of multiple LUNs and/or may be associated with a portion of a LUN, such as a portion of less than all tracks of the LUN. In this latter case, a single LUN may be partitioned into groups or ranges of tracks of the LUN and a single attribute may be associated with each such defined group or range of tracks of the LUN (e.g., multiple attributes associated with a single LUN).

Figure 13:
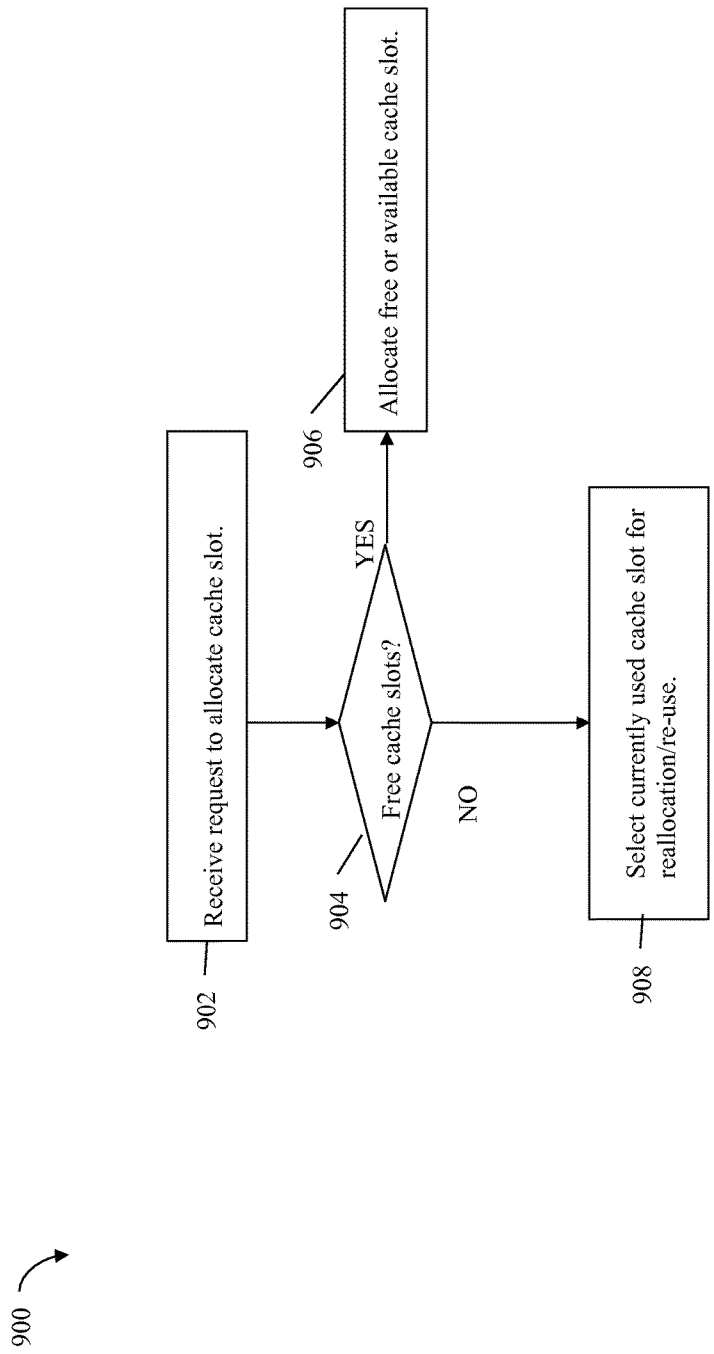

Referring to FIG. 13, shown is a flowchart of processing steps that may be performed in connection with cache management in an embodiment in accordance with techniques herein. Generally, cache management software may perform such processing to maintain the cache. Such processing may include allocating cache slots as needed, for example, such as to store write pending data or write operation data which is later destaged (e.g., written out) to physical storage, to store data read from physical storage, to store location MD, to store non-location MD, and the like.

At step 902, cache management software may receive a request to allocate a cache slot. Some examples of when a cache slot may be requested are noted above. At step 904, a determination is made as to whether there is a free cache slot. A free cache slot may be, for example, a cache slot which is currently not allocated or may not otherwise include valid data, such as valid user data. If step 904 evaluates to yes, control proceeds to step 906 where a free cache slot is allocated. Otherwise, if step 904 evaluates to no, control proceeds to step 908. In step 908, processing may be performed to select a currently used cache slot for reallocation or reuse. Step 908 may include performing any suitable processing such as, for example, writing out to physical storage a cache slot including write pending data whereby the cache slot may then be reused or allocated. Step 908 may include, for example, selecting a cache slot including valid user data which has been least frequently accessed or is expected not to be referenced in the near future. To perform such an assessment in this latter case, one or more heuristics may be used, for example, to track when user data of cache slots was last accessed and select the cache slot which has the oldest or least recent access time. Step 908 may include using criteria, such as the attribute settings of FIG. 12 denoting which location MD for which LUNs is marked as cache resident. For example, step 908 processing may include examining cache slots including location MD. If a cache slot includes location MD for a LUN having an attribute setting of cache resident, the cache slot may not be considered a candidate for selection for reallocation in step 908. However, if the cache slot includes location MD for a LUN having an attribute setting of not cache resident, the cache slot may be considered a candidate for selection for reallocation in step 908. In the case of a "not cache resident" attribute setting associated with location MD for a LUN stored in a cache slot, such location MD may be paged out of cache if selected in step 908. In a similar manner, step 908 may consider a candidate cache slot for selection one that includes non-location MD as described elsewhere herein.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing I/O operations comprising:
   receiving, from a requester, a read operation to read first data from a first location;
   determining whether the read operation is a read miss and whether non-location metadata for the first location is stored in cache; and
   responsive to determining that the read operation is a read miss and that the non-location metadata for the first location is not stored in cache, performing first processing including:
   issuing concurrently a first read request to read the first data from physical storage and a second read request to read the non-location metadata for the first location from physical storage, wherein metadata including the non-location metadata for the first location and location metadata for the first location is stored on physical storage that is a form of non-volatile memory and the cache is a form of volatile memory providing faster access to stored data than the non-volatile memory;
   responsive to receiving the non-location metadata requested by the second read request and receiving the first data requested by the first read request, performing data validation of the first data using at least some of the non-location metadata; and
   responsive to the data validation completing successfully, storing the first data in the cache and returning the first data to the requester.

2. The method of claim 1, wherein said determining whether the read operation is a read miss uses the location metadata for the first location.

3. The method of claim 2, wherein, prior to determining whether the read operation is a read miss and determining whether non-location metadata for the first location is stored in cache, the method includes performing other processing comprising:
   determining whether the location metadata for the first location is stored in cache; and
   responsive to determining the location metadata for the first location is not in cache, obtaining the location metadata from physical storage and storing the location metadata in the cache.

4. The method of claim 3, wherein, responsive to determining the location metadata for the first location is not in cache, another request is issued to read a location metadata chunk from physical storage, the location metadata chunk including the location metadata for the first location and additional location metadata for one or more other locations and wherein the location metadata chunk is stored in the non-volatile memory.

5. The method of claim 4, wherein the first location is identified using a logical device and first offset location on the logical device.

6. The method of claim 5, wherein the additional location metadata includes other location metadata for another offset location logically following the first offset location.

7. The method of claim 3, wherein the location metadata is currently in the cache and is associated with an attribute having a first setting indicating the location metadata is cache resident denoting that the location metadata is not removed from the cache until the attribute is modified to a second setting indicating that the location metadata is no longer cache resident.

8. The method of claim 7, wherein the attribute for the location metadata is dynamically modified from the first setting to the second setting responsive to determining that at least a portion of a logical device including the first location has a change in status from active to inactive.

9. The method of claim 8, wherein, when the attribute has the second setting, processing performed for cache management of the cache removes the location metadata from a first cache location to reuse the first cache location for storing other data.

10. The method of claim 7, wherein, while the attribute has the first setting, processing performed for cache management of the cache does not remove the location metadata from a first cache location to reuse the first cache location for storing other data.

11. The method of claim 1, wherein the first location is a logical location on a logical device having storage provisioned on one or more physical devices of a data storage system.

12. A system comprising:
   a processor;
   and a memory comprising code stored thereon, that when executed, performs a method of processing I/O operations comprising:
      receiving, from a requester, a read operation to read first data from a first location;
      determining whether the read operation is a read miss and whether non-location metadata for the first location is stored in cache; and
      responsive to determining that the read operation is a read miss and that the non-location metadata for the first location is not stored in cache, performing first processing including:
         issuing concurrently a first read request to read the first data from physical storage and a second read request to read the non-location metadata for the first location from physical storage, wherein metadata including the non-location metadata for the first location and location metadata for the first location is stored on physical storage that is a form of non-volatile memory and the cache is a form of volatile memory providing faster access to stored data than the non-volatile memory;
         responsive to receiving the non-location metadata requested by the second read request and receiving the first data requested by the first read request, performing data validation of the first data using at least some of the non-location metadata; and
         responsive to the data validation completing successfully, storing the first data in the cache and returning the first data to the requester.

13. A non-transitory computer readable medium comprising code stored thereon, that when executed, performs a method of processing I/O operations comprising:
   receiving, from a requester, a read operation to read first data from a first location;
   determining whether the read operation is a read miss and whether non-location metadata for the first location is stored in cache; and
   responsive to determining that the read operation is a read miss and that the non-location metadata for the first location is not stored in cache, performing first processing including:
      issuing concurrently a first read request to read the first data from physical storage and a second read request to read the non-location metadata for the first location from physical storage, wherein metadata including the non-location metadata for the first location and location metadata for the first location is stored on physical storage that is a form of non-volatile memory and the cache is a form of volatile memory providing faster access to stored data than the non-volatile memory;
      responsive to receiving the non-location metadata requested by the second read request and receiving the first data requested by the first read request, performing data validation of the first data using at least some of the non-location metadata; and
      responsive to the data validation completing successfully, storing the first data in the cache and returning the first data to the requester.

14. The non-transitory computer readable medium of claim 13, wherein said determining whether the read operation is a read miss uses the location metadata for the first location.

15. The non-transitory computer readable medium of claim 14, wherein, prior to determining whether the read operation is a read miss and determining whether non-location metadata for the first location is stored in cache, the method includes performing other processing comprising:
   determining whether the location metadata for the first location is stored in cache; and
   responsive to determining the location metadata for the first location is not in cache, obtaining the location metadata from physical storage and storing the location metadata in the cache.

16. The non-transitory computer readable medium of claim 15, wherein, responsive to determining the location metadata for the first location is not in cache, another request is issued to read a location metadata chunk from physical storage, the location metadata chunk including the location metadata for the first location and additional location metadata for one or more other locations and wherein the location metadata chunk is stored in the non-volatile memory.

17. The non-transitory computer readable medium of claim 16, wherein the first location is identified using a logical device and first offset location on the logical device.

18. The non-transitory computer readable medium of claim 17, wherein the additional location metadata includes other location metadata for another offset location logically following the first offset location.

* * * * *